United States Patent
Sugiura et al.

[11] Patent Number: 5,225,936
[45] Date of Patent: Jul. 6, 1993

[54] PHOTO-TAKING LENS HAVING A FILTER

[75] Inventors: Muneharu Sugiura, Tokyo; Satoshi Yanagawa, Kanagawa, both of Japan

[73] Assignee: Canon Kabushiki Kaisha, Tokyo, Japan

[21] Appl. No.: 460,551

[22] Filed: Jan. 3, 1990

[30] Foreign Application Priority Data

Jan. 13, 1989 [JP] Japan .................... 1-006511

[51] Int. Cl.⁵ .............................. G02B 15/14
[52] U.S. Cl. .................... 359/679; 359/676; 359/888
[58] Field of Search ............. 350/423, 425, 427, 314, 350/317, 318, 167, 438; 358/213.22, 213.25, 222, 55; 359/676, 678, 683, 679, 888, 891

[56] References Cited

U.S. PATENT DOCUMENTS

| | | | |
|---|---|---|---|
| 4,184,749 | 1/1980 | Grossman | 350/438 |
| 4,763,998 | 8/1988 | Tsuji et al. | 350/427 |
| 4,854,681 | 8/1989 | Kato et al. | 350/427 |
| 4,892,397 | 1/1990 | Horiuchi | 350/425 |

*Primary Examiner*—Bruce Y. Arnold
*Assistant Examiner*—Hung Xuan Dang
*Attorney, Agent, or Firm*—Fitzpatrick, Cella, Harper & Scinto

[57] ABSTRACT

A photo-taking lens comprises a lens component which allows to exit therefrom a bundle of rays forming the image of an object, a diaphragm which is disposed on the object side of the lens component and has a variable aperture, and an optical filter which is disposed adjacently to the diaphragm and is formed in a curved shape.

15 Claims, 2 Drawing Sheets

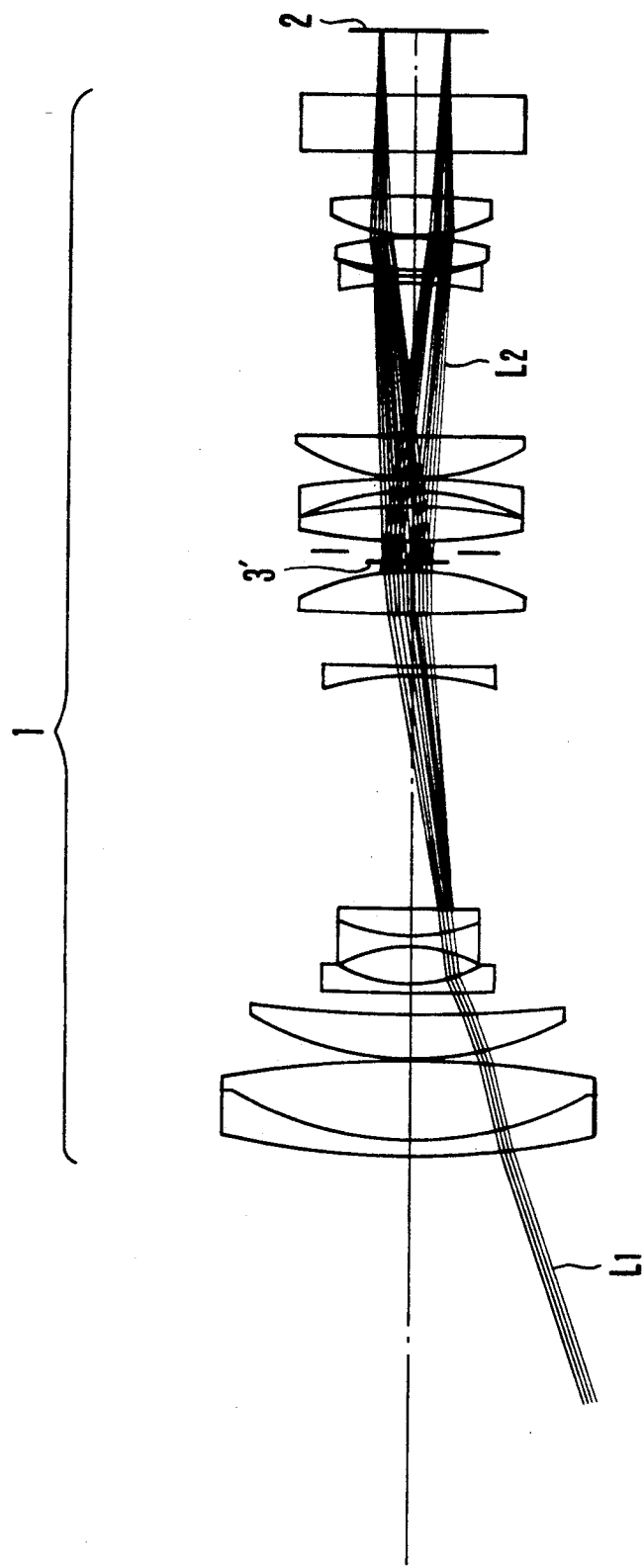

PHOTO-TAKING LENS HAVING A FILTER

BACKGROUND OF THE INVENTION

1. Field of the Invention:

This invention relates to a video camera or a still video camera and more particularly to a monofocal lens or a zoom lens adapted for the photo-taking system of the camera of the above-stated kind.

2. Description of the Related Art:

The use of a solid-state image sensor such as a CCD for the video camera has enhanced the sensitivity of the camera. As a result, the diaphragm of the camera must be greatly stopped down in taking a picture of an object which is either under a clear sky or has a high degree of luminance. Under such a condition, therefore, the camera tends to experience hunting of the diaphragm or to be affected by the diffraction of light due to the small aperture. This deteriorates the image forming performance of the camera. To solve this problem, it has been practiced to provide a filmy ND (neutral density) filter which is either disposed adjacent to the diaphragm or at the diaphragm blades.

This is because, the quantity of a bundle of rays passing through the ND filter decreases when the diaphragm is stopped down. Compared with a condition of using no ND filter, the use of the ND filter allows the diaphragm to be in a larger aperture position for the same brightness of the field, so that the adverse optical effect due to a small aperture can be moderated by the ND filter.

In the case of a zoom lens or the like, however, the diaphragm which determines the F number of the lens is disposed at an afocal light flux part in most cases. In addition to that, the reflection factor of the surface of the solid-state image sensor has become higher. Therefore, when the ND filter is mounted on the lens, a ghost image is generated by a bundle of rays L2 produced when a bundle of rays which is first reflected at the solid-state image sensor surface 2 is again reflected by the ND filter surface 3' as shown in FIG. 2 of the accompanying drawings. The same problem also arises with a wavelength selective filter or the like other than the ND filter disposed adjacent to the diaphragm. Even in the case of a monofocal lens, image deterioration might also take place depending on the state of the bundle of rays obtained at a point where the diaphragm is disposed.

In connection with the generation of the ghost by the surface of an image forming lens, a photo-taking lens which is arranged to lessen the possibility of generation of the ghost has been disclosed in U.S. patent application Ser. No. 301,951, filed on Jan. 26, 1989.

SUMMARY OF THE INVENTION

It is an object of the invention to provide a photo-taking lens having a filter, which is arranged to moderate any adverse effect on image forming performance due to the return of a bundle of rays to an image sensing plane after the bundle of rays is reflected by the surface of the filter.

To attain this object, a monofocal or zoom lens which has an optical filter in the neighborhood of a diaphragm is arranged according to this invention as follows: The optical filter which is disposed either adjacent to a diaphragm or at the blade of the diaphragm is arranged to have its surface curved to a slight degree in such a way as to cause the bundle of rays reflected by the filter surface to diverge on an image forming plane.

The above and other objects and features of the invention will become apparent from the following detailed description of an embodiment thereof taken in conjunction with the accompanying drawings.

BRIEF DESCRIPTION OF THE DRAWINGS

FIG. 2 is a sectional view showing the optical behavior of the conventional lens arrangement.

DETAILED DESCRIPTION OF THE PREFERRED EMBODIMENT

Figure 1:
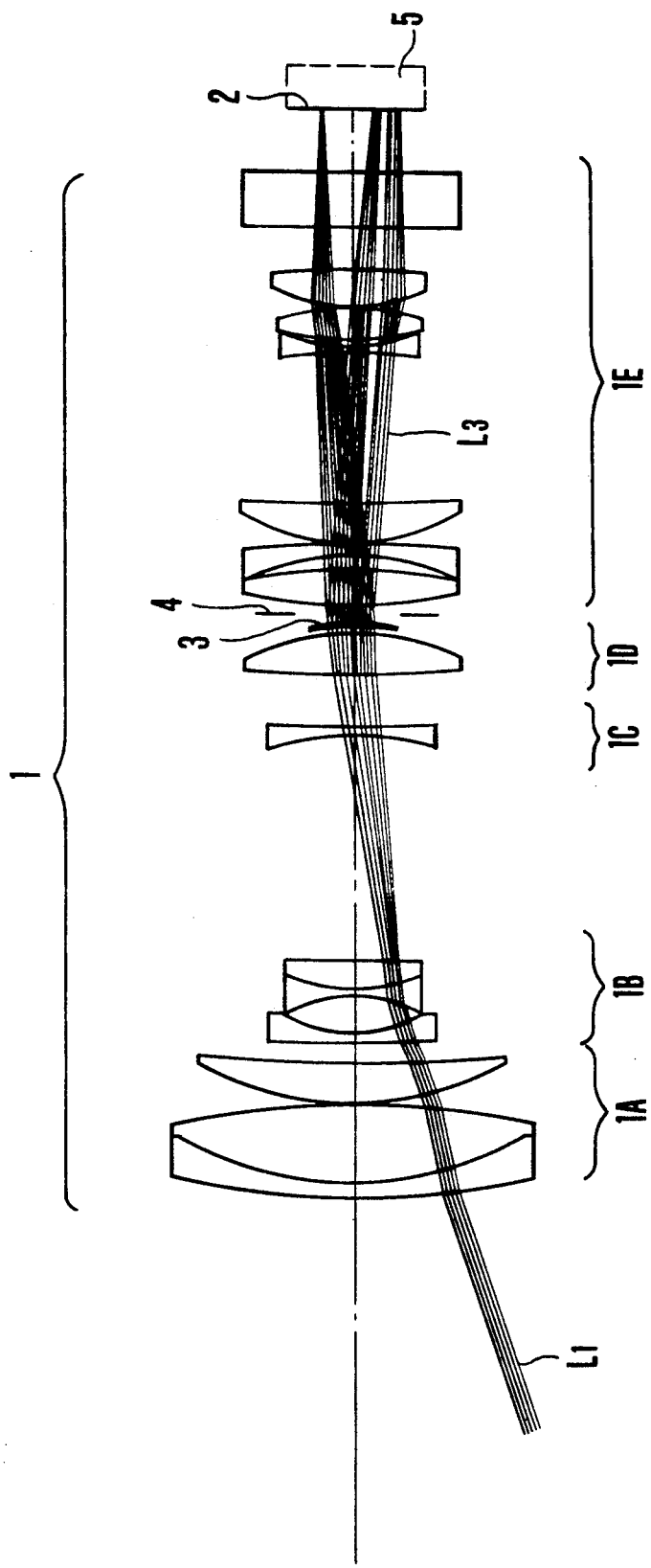
FIG. 1 is a sectional view showing an optical system arranged according to this invention.

FIG. 1 shows an embodiment of this invention. The illustration shows a zoom lens 1 including a focusing lens component 1A; a variator lens component 1B; a compensator lens component 1C; a lens component 1D which is arranged to convert a light flux into an afocal state; and a relay lens component 1E. A reference numeral 2 denotes an image forming plane. In the case of a video camera, the solid-state image sensor 5 have its light receiving surface disposed on the image forming plane 2. For a zooming action, the variator lens component 1B and the compensator lens component 1C are simultaneously and differentially shifted in the direction of an optical axis. A filmy ND filter 3 is arranged to have a convex surface which protrudes toward the image forming plane 2. A diaphragm 4 has a variable aperture and is arranged to define the F number of the optical system. The edge of the ND filter may be adhesively attached to one of the blades of the diaphragm. Theoretically, an advantageous effect is attainable by arranging the ND filter 3 either to have its convex side or its concave side facing the image forming plane 2. However, according to the results of tests, arrangement to have the convex surface of the ND filter 3 disposed on the side of the image forming plane 2 gives a better effect. Further, the advantageous effect is also attainable by arranging the ND filter 3 to have a cylindrical surface instead of a spherical surface.

A reference symbol L1 denotes an off-axis bundle of rays imaged on the image forming plane 2. A part of the bundle of rays is reflected to come back by the light receiving surface of the solid-state image sensor which coincides with the image forming plane. The part of the bundle of the rays which thus comes back is reflected by the surface of the ND filter 3 and again advances toward the image forming plane 2. At that time, the convex shape of the surface of the ND filter 3 converts this part of the bundle of rays into a divergent bundle of rays L3 which still remains in a scattered state when it arrives at the image forming plane 2.

Therefore, no ghost image appears on an image receiver. The radius of curvature of the filter 3 is normally arranged to be between 100 mm and 200 mm in the case of a video camera.

Generally, an ND filter or a wavelength selective filter used for an image forming system is in a filmy form uniformly measuring about 0.1 mm in thickness. In case that the material for the filter of this kind is obtained in a rolled state, the material in most cases still remains in a curved state even after it is spread and stretched out. The curved state can be utilized for obtaining a desired radius of curvature. However, in cases where the properties of the material are to be utilized, the shape of the material is limited to a cylindrical form.

In obtaining the filter by press punching, therefore, the filter material can be transformed into the above-stated spherical shape either by a cutting force applied to the periphery of the filter or by using a punching rod the tip of which is formed to have a desired radius of curvature. In another conceivable method of forming it in the spherical shape, the hygroscopic property of a material may be utilized to form the filter by applying moisture to one side thereof.

In accordance with the arrangement of the embodiment, the ghost image can be prevented from being generated as mentioned in the foregoing. Therefore, it is an advantage of the embodiment that the picture quality can be increased when the image is obtained with the diaphragm stopped down to a small aperture position.

What is claimed is:

1. A photo-taking lens comprising:
   a lens component for allowing to exit therefrom a bundle of rays forming an image of an object;
   a diaphragm disposed on the object side of said lens component and having a variable aperture; and
   an optical filter, disposed adjacent to said diaphragm, which is curved in such a manner so as to prevent the light reflected from an image plane from forming a ghost on the image plane after the light is reflected by said optical filter and passes through said lens component.

2. A photo-taking lens according to claim 1, wherein said filter has a convex shape which protrudes toward the image side.

3. A photo-taking lens according to claim 1 or 2, wherein said filter is formed in a spherical shape.

4. A photo-taking lens according to claim 1 or 2, wherein said filter is formed in a cylindrical shape.

5. A photo-taking lens according to claim 1, further comprising a plurality of movable lens components arranged on the object side of said diaphragm to be differentially movable for zooming.

6. A photo-taking lens according to claim 5, further comprising a lens component interposed in between said diaphragm and said plurality of movable lens components and arranged to convert into an afocal state a bundle of rays which exits from said plurality of movable lens components.

7. A photo-taking lens according to claim 1, wherein said optical filter is an ND filter.

8. A photo-taking lens according to claim 1, wherein said optical filter is a wavelength selective filter.

9. A photo-taking zoom lens arranged to permit zooming by moving a plurality of lens components, comprising:
   an afocal lens component arranged to convert a bundle of rays into a substantially afocal state;
   an image forming lens component arranged to image said afocal bundle of rays; and
   an optical filter interposed in between said afocal lens component and said image forming lens component and curved in such a manner so as to prevent the light reflected from an image plane from forming a ghost on the image plane after the light is reflected by said optical filter and passes through said image forming lens component.

10. A photo-taking lens according to claim 9, wherein said filter is formed in a convex shape which protrudes toward the image side.

11. A photo-taking lens according to claim 9 or 10, wherein said filter is formed in a spherical shape.

12. A photo-taking lens according to claim 9 or 10, wherein said filter is formed in a cylindrical shape.

13. A photo-taking lens according to claim 9, wherein said optical filter is an ND filter.

14. A photo-taking lens according to claim 9, wherein said optical filter is a wavelength selective filter.

15. A photo-taking lens according to claim 9, further comprising a diaphragm interposed in between said afocal lens component and said image forming lens component and having a variable aperture.

* * * * *